(12) United States Patent
Johnston

(10) Patent No.: US 11,300,372 B2
(45) Date of Patent: Apr. 12, 2022

(54) SYSTEM FOR HYDROGEN DETECTION IN COOLING TOWERS

(71) Applicant: Multi-Chem Group, LLC., Houston, TX (US)

(72) Inventor: William Robert Johnston, Richmond, TX (US)

(73) Assignee: Multi-Chem Group, LLC, Houston, TX (US)

(*) Notice: Subject to any disclaimer, the term of this patent is extended or adjusted under 35 U.S.C. 154(b) by 175 days.

(21) Appl. No.: 16/434,298

(22) Filed: Jun. 7, 2019

(65) Prior Publication Data

US 2020/0049434 A1  Feb. 13, 2020

Related U.S. Application Data

(60) Provisional application No. 62/716,834, filed on Aug. 9, 2018.

(51) Int. Cl.
| | |
|---|---|
| F28F 27/00 | (2006.01) |
| F28C 1/00 | (2006.01) |
| F28F 25/02 | (2006.01) |
| F28F 25/00 | (2006.01) |

(52) U.S. Cl.
CPC .............. *F28F 27/003* (2013.01); *F28C 1/00* (2013.01); *F28F 25/02* (2013.01); *F28C 2001/006* (2013.01); *F28F 2025/005* (2013.01); *F28F 2265/18* (2013.01)

(58) Field of Classification Search
CPC ...... F28F 27/003; F28F 25/02; F28F 2265/18; F28F 2025/005; F28C 1/00; F28C 2001/006
See application file for complete search history.

(56) References Cited

U.S. PATENT DOCUMENTS

| | | | |
|---|---|---|---|
| 4,324,761 A | 4/1982 | Harris | |
| 4,373,379 A * | 2/1983 | Obara | H02K 9/24 73/40.5 R |
| 6,471,136 B1 * | 10/2002 | Chatterjee | F25D 17/042 237/2 B |
| 6,485,547 B1 * | 11/2002 | Iijima | F23J 15/04 96/242 |
| 2002/0088757 A1 * | 7/2002 | Imaoka | C02F 5/00 210/696 |
| 2011/0174003 A1 | 7/2011 | Wenger | |
| 2012/0312079 A1 | 12/2012 | Maruno et al. | |
| 2015/0226718 A1 * | 8/2015 | Holt | G01N 27/04 73/31.05 |

(Continued)

OTHER PUBLICATIONS

International Search Report for Application PCT/US19/36225 dated Oct. 1, 2019.

(Continued)

*Primary Examiner* — Larry L Furdge
(74) *Attorney, Agent, or Firm* — Tenley Krueger; C. Tumey Law Group PLLC

(57) ABSTRACT

A method may include: drawing a slip stream sample from a cooling fluid stream, the cooling fluid stream being fluidically coupled to an outlet of a heat exchanger and an inlet of a cooling tower; introducing the slip stream sample into an expansion chamber; and measuring a concentration of hydrogen gas within a headspace of the expansion chamber.

20 Claims, 1 Drawing Sheet

(56) References Cited

U.S. PATENT DOCUMENTS

| | | | |
|---|---|---|---|
| 2015/0284275 A1* | 10/2015 | Ongeche | C02F 1/4602 |
| | | | 210/668 |
| 2016/0041539 A1* | 2/2016 | Kemp | G08C 19/02 |
| | | | 700/80 |
| 2018/0306680 A1* | 10/2018 | Hu | G01N 1/22 |

OTHER PUBLICATIONS

Thomasnet—Types of Industrial Control Systems. Retrieved from https://www.thomasnet.com/articles/instruments-controls/types-of-industrial-control-systems/ on Apr. 21, 2020.

* cited by examiner

SYSTEM FOR HYDROGEN DETECTION IN COOLING TOWERS

BACKGROUND

Cooling towers may be used in industry to cool water from process heat exchangers. Water may be used in process heat exchangers to cool a process fluid thereby raising the temperature of the water. Cooling towers may thereafter be used to cool the water and reject excess heat to atmosphere such that the water can be circulated back to the process heat exchanger. Water utilized in heat exchangers may come into contact with various processes that may introduce contaminants into the water. The contaminants may be transported from the process heat exchanger, or any other place where the contaminants may be introduced, alongside the water to the cooling tower. As the cooling tower typically experiences a high flow rate of water from process heat exchangers, contaminants present in water transported to the cooling tower may begin to pool in the cooling tower. In examples where the contaminants are hazardous or explosive, pooled contaminants may lead to a potentially dangerous operating condition.

Hydrogen may contaminate heat exchanger water in some processes. The lower flammability limit of hydrogen in air may be as low as 4% by volume thereby making small amounts of hydrogen a potential fire or explosion hazard. Furthermore, the flashpoint of hydrogen is less than 23° C. giving hydrogen a NFPA 704 flammability rating of 4. Cooling towers may be especially susceptible to hydrogen pooling as cooling towers may process large volumes of water per hour thereby presenting a centralized place for hydrogen to be transported to and collected.

BRIEF DESCRIPTION OF THE DRAWINGS

These drawings illustrate certain aspects of the present disclosure, and should not be used to limit or define the disclosure.

DETAILED DESCRIPTION

The present disclosure may relate to cooling tower systems, and, in one or more implementations, the detection of explosive gasses within cooling towers.

Figure 1:
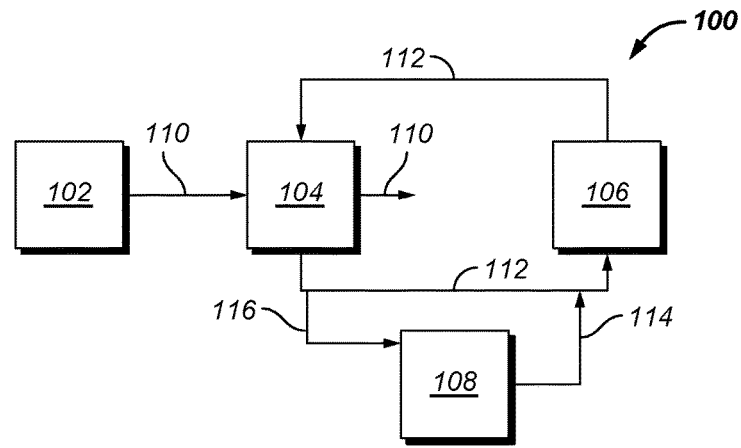
FIG. 1 is a schematic illustration of cooling tower.

FIG. 1 is a schematic illustration of a gas detection system 100. A process 102 may produce a processes stream 110. Process 102 may be any process which produces a hot process stream as a product, or any intermediate process which produces a hot stream. Some examples of process 102 may include, but are not limited to, reactors, distillation columns, heaters, or any other process. Process stream 110 may be introduced into heat exchanger 104 whereby a cooling fluid 112, such as water, is brought in thermal contact with process stream 110. Cooling fluid 112 may be at a temperature lower than process stream 110 to facilitate heat exchange between cooling fluid 112 and process stream 110. Process stream 110 may exit heat exchanger 104 at a relatively lower temperature than entry and cooling fluid 112 may exit heat exchanger 104 at a relatively higher temperature than entry. Although only one heat exchanger is shown, cooling fluid 112 may be use in a plurality of heat exchangers for different process streams. Cooling fluid 112 may be introduced to contaminants from process streams in the heat exchangers or during transport of cooling fluid 112 between heat exchangers, for example. Some non-limiting examples of contaminants may include, for example, Hz, methane, ethane, ethylene, acetylene, propane, propylene, n-butane, iso-butane, and combinations thereof.

Cooling fluid 112 leaving heat exchanger 104 may be too hot to continue to be used to cool further process streams and may be conveyed to cooling tower 106. In cooling tower 106, evaporative cooling or forced convection cooling may remove heat from cooling fluid thereby generating a cooling fluid with a lowered temperature. The cooling fluid may exit cooling tower 106 and be conveyed back to heat exchanger 104. A slip stream 116 may be taken from cooling fluid 112 before the cooling fluid 112 is introduced into cooling tower 106. Slip stream 116 may be conveyed to detection unit 108 for analysis. Once analyzed, the contents of slip stream 116 may be returned to cooling fluid 112 via return line 114. Although slip stream 116 is illustrated as being drawn from cooling fluid 112 between heat exchanger 104 and cooling tower 106, slip stream may be taken at any point after a heat exchanger. In an example where cooling fluid 112 is conveyed to a plurality of heat exchangers, a sample may be drawn after any heat exchanger in the plurality of heat exchangers. There may be a heat exchanger fluidically coupled to a process which may be prone to introducing contaminants into cooling fluids and thus may require more closely monitored sampling.

Figure 2:
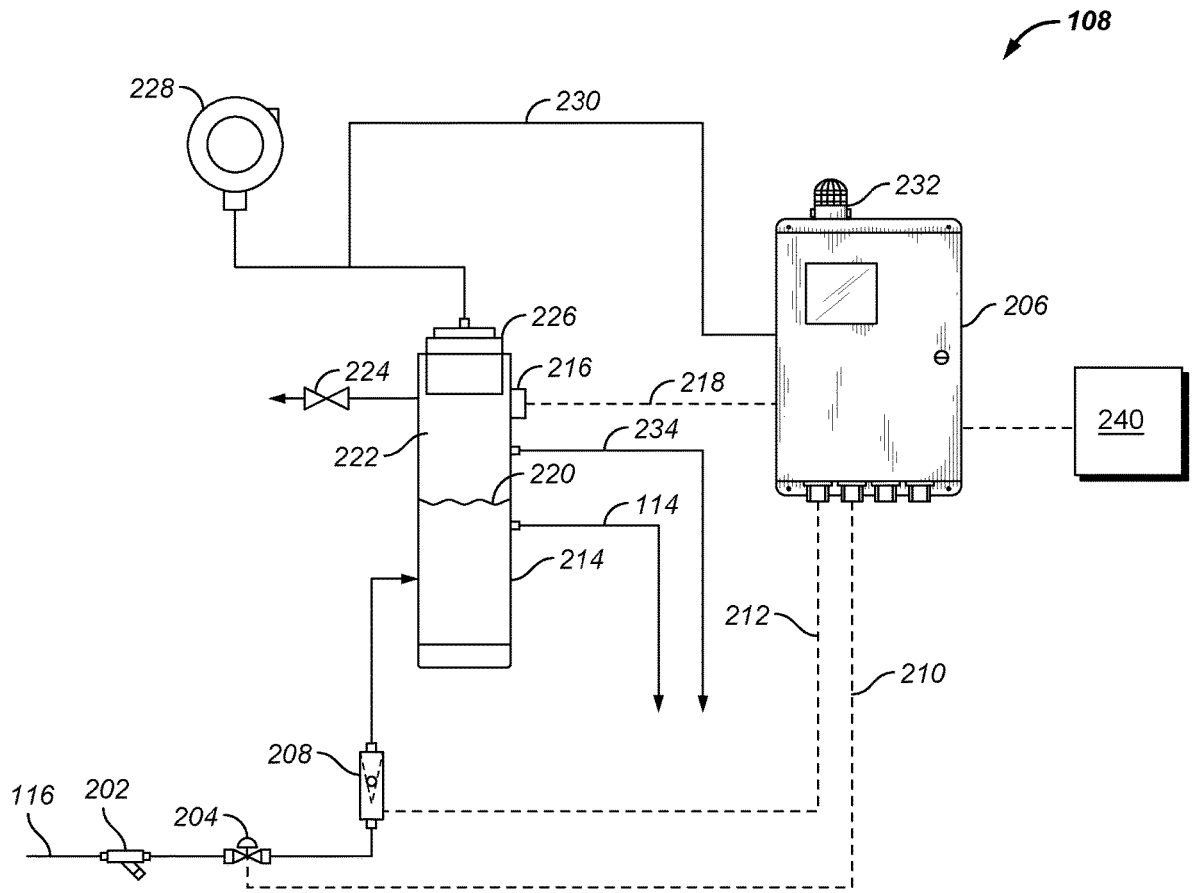
FIG. 2 is schematic illustration of a hydrogen detection system.

A detailed view of detection unit 108 is illustrated in FIG. 2. Slip stream 116 may be drawn from detection unit 108 and into strainer 202. Strainer 202 may reduce sediment and foreign objects from entering detection unit 108. From strainer 202, slip stream 116 may flow into control valve 204 which may restrict volumetric flow and throttle pressure detection unit 108. Control valve 204 may be any valve including, but not limited to, a needle valve, ball valve, poppet valve, or diaphragm valve, for example. Control valve 204 may further include a pressure gauge and/or a pressure transducer, for example, and may communicate pressure to control system 206 via signal 210. From control valve 204, slip stream 116 may flow into flow meter 208. Flow meter 208 may include any flow meter including, but not limited to, obstruction type flow meter, inferential, electromagnetic, positive-displacement, vortex shedding, anemometer, ultrasonic, or Coriolis, for example. Flow meter 208 may communicate flow rate to control system 206 via signal 212 for example. From flow meter 208, slip stream 116 may be introduced into expansion chamber 214. Expansion chamber 214 may include liquid level sensor 216 that detects a liquid level within expansion chamber 214 and provides signal 218 to control system 206. From any one of or combination of signal 210, signal 212, and signal 218, control system 206 may provide a control signal to control valve 204 to control a liquid level 220 within expansion chamber 214 by controlling flow into expansion chamber 214, for example. Overflow line 234 may prevent expansion chamber 214 from completely filling with water. Overflow line 234 may be tied back to cooling fluid 112 or may be open to atmosphere to alert an operator that detection unit 108 is malfunctioning. Relief valve 224 may be disposed on expansion chamber 214 to provide a means for trapped gasses in headspace 222 to vent in the case where a pressure exceeds a safety margin for expansion chamber 214.

Slip stream 116 may include water and contaminants as previously discussed. As slip stream 116 flows into expansion chamber 214, volatile gasses, such as hydrogen, may separate from water. Hydrogen, due to its volatility at ambient pressure and temperature, may spontaneously separate from the cooling water to occupy headspace 222 above liquid level 220. Hydrogen present in headspace 222 may be detected by hydrogen detector 226. Hydrogen detector 226 may be any type of hydrogen detector suitable for a particular application. For example, hydrogen detector 226 may comprise a gas detector capable of detecting hydrogen in ppm ranges or as a function of % LEL (lower explosive limit). Display 228 may optionally be electrically coupled to hydrogen detector 226 to display a concentration of hydrogen in headspace 222, for example. Hydrogen detector 225 may be electrically coupled to control system 206 via signal 230, for example. Control system 206 may monitor signal 230 and sound an alarm 232 when signal 230 meets or exceeds a setpoint level for hydrogen in headspace 222. Alarm 232 may include any kinds of alarms such as sirens, strobes, or a combination thereof. The set point may be a concentration of hydrogen in ppm or as a percentage of LEL, for example. Hydrogen detector 226 may alternatively, or in addition to, be operable to detect other organic gasses such as methane, ethane, ethylene, acetylene, propane, propylene, n-butane, and iso-butane, for example.

Control system 206 may be further coupled to a distributed control system (DCS) to alert operators at a remote location of concentrations of hydrogen and if an alarm is currently being sounded by detection unit 108. Control system 206 may send a signal, such as a 4-20 mA signal, to a remote location such that the concentration of hydrogen may be monitored. Control system 206 or DCS 240 may be connected to other process safety systems such as alarms and process shutdown equipment such that if the quantity of hydrogen exceeds a predefined set point, alarms may sound, or processes may be shutdown.

The disclosure may be practiced according to any of the following statements:

Statement 1. A method comprising: drawing a slip stream sample from a cooling fluid stream, the cooling fluid stream being fluidically coupled to an outlet of a heat exchanger and an inlet of a cooling tower; introducing the slip stream sample into an expansion chamber; and measuring a concentration of hydrogen gas within a headspace of the expansion chamber.

Statement 2. The method of statement 1 wherein the cooling fluid stream comprises water and at least one gas selected from the group consisting of hydrogen, methane, ethane, ethylene, acetylene, propane, propylene, n-butane, iso-butane, and combinations thereof.

Statement 3. The method of any of statements 1-2 wherein the cooling fluid is contaminated with the at least one gas while in the heat exchanger.

Statement 4. The method of any of statements 1-3 wherein the at least one gas is separated from the water into the headspace.

Statement 5. The method of any of statements 1-4 wherein the measuring a concentration of hydrogen gas comprises measuring parts per million of hydrogen in the headspace or a percentage lower explosive limit of hydrogen in the headspace.

Statement 6. The method of any of statements 1-5 further comprising: comparing the concentration of hydrogen to a set point; and activating an alarm when a concentration of hydrogen in the headspace exceeds the set point.

Statement 7. The method of any of statements 1-6 further comprising measuring a concentration of at least one gas selected from the group consisting of methane, ethane, ethylene, acetylene, propane, propylene, n-butane, or iso-butane, and combinations thereof.

Statement 8. An apparatus comprising: a flow line fluidically coupled to an outlet of a heat exchanger; an expansion chamber fluidically coupled to the flow line; a gas detector disposed within the expansion chamber, the gas detector being operable to quantify a concentration of hydrogen within the expansion chamber; an alarm; and a control system operable to interpret a signal from the gas detector and activate the alarm when the signal exceeds a set point.

Statement 9. The apparatus of statement 8 further comprising a strainer fluidically coupled between the heat exchanger and the expansion chamber.

Statement 10. The apparatus of any of statements 8-9 further comprising a control valve fluidically coupled between the heat exchanger and the expansion chamber.

Statement 11. The apparatus of any of statements 8-10 wherein the flow line is a slip stream from a cooling fluid stream, and wherein the expansion chamber further comprises a return line fluidically coupled to the cooling fluid stream.

Statement 12 The apparatus of any of statements 8-11 wherein the gas detector is further operable to quantify at least one gas selected from the group consisting of methane, ethane, ethylene, acetylene, propane, propylene, n-butane, or iso-butane, and combinations thereof.

Statement 13. The apparatus of any of statements 8-12 wherein the control system is further operable to connect to a distributed control system and relay the concentration of hydrogen.

Statement 14. The apparatus of any of statements 8-13 further comprising a flow meter fluidically coupled between the heat exchanger and the expansion chamber.

Statement 15. A system comprising: a heat exchanger; a cooling tower; a cooling stream fluidically coupled to an outlet of the heat exchanger and an inlet of the cooling tower; an expansion chamber having an inlet to receive a slip stream from a cooling fluid stream; and a hydrogen detector disposed in a headspace within the expansion chamber.

Statement 16. The system of statement 15 further comprising an alarm and a control system, the control system being configured to activate the alarm when a setpoint concentration of hydrogen is detected within the headspace.

Statement 17. The system of any of statements 15-16 further comprising a distributed control system configured to receive a signal from the control system.

Statement 18. The system of any of statements 15-17 wherein the signal is a 4-20 mA signal.

Statement 19. The system of any of statements 15-18 wherein the hydrogen detector is configured to detect a concentration of hydrogen in parts per million, as a percentage of lower explosive limit, or a combination thereof.

Statement 20. The system of any of statements 15-19 further comprising a gas detector configured to detect at least one gas selected from the group consisting of methane, ethane, ethylene, acetylene, propane, propylene, n-butane, or iso-butane, and combinations thereof.

It should be understood that, although individual examples may be discussed herein, the present disclosure covers all combinations of the disclosed examples, including, without limitation, the different component combinations, method step combinations, and properties of the system.

It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces.

All numerical values within the detailed description and the claims herein modified by "about" or "approximately" with respect the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:

1. A method comprising:
    drawing a slip stream sample from a cooling fluid stream, the cooling fluid stream being fluidically coupled to an outlet of a heat exchanger and an inlet of a cooling tower;
    conveying the slip stream sample into an expansion chamber of a detection unit;
    controlling a liquid level in the expansion chamber with a control valve and a liquid level sensor, the liquid level sensor disposed within the expansion chamber;
    analyzing the slip stream sample and measuring a concentration of hydrogen gas within a headspace of the expansion chamber; and
    returning the slip stream sample to the cooling fluid stream.

2. The method of claim 1 wherein the cooling fluid stream comprises water and at least one gas selected from the group consisting of hydrogen, methane, ethane, ethylene, acetylene, propane, propylene, n-butane, iso-butane, and combinations thereof.

3. The method of claim 2 wherein the cooling fluid is contaminated with the at least one gas while in the heat exchanger.

4. The method of claim 2 wherein the at least one gas is separated from the water into the headspace.

5. The method of claim 1 wherein the measuring a concentration of hydrogen gas comprises measuring parts per million of hydrogen in the headspace or a percentage lower explosive limit of hydrogen in the headspace.

6. The method of claim 1 further comprising:
    comparing a signal, from the detection unit, to a set point for a concentration of hydrogen; and
    activating an alarm when the concentration of hydrogen in the headspace exceeds the set point.

7. The method of claim 1 further comprising measuring a concentration of at least one gas selected from the group consisting of methane, ethane, ethylene, acetylene, propane, propylene, n-butane, or iso-butane, and combinations thereof.

8. An apparatus comprising:
    a flow line fluidically coupled to an outlet of a heat exchanger, wherein the flow line is a slip stream from a cooling fluid stream;
    an expansion chamber fluidically coupled to the flow line, wherein the expansion chamber comprises a return line fluidically coupled to the cooling fluid stream, a liquid level sensor disposed within the expansion chamber;
    a control valve operable to maintain a liquid level in the expansion chamber;
    a hydrogen detector disposed within the expansion chamber, the hydrogen detector being operable to quantify a concentration of hydrogen in the slip stream before the slip stream is returned to the cooling fluid stream; and
    an alarm.

9. The apparatus of claim 8 further comprising a strainer fluidically coupled between the heat exchanger and the expansion chamber.

10. The apparatus of claim 9, wherein the control valve is disposed upstream from the expansion chamber.

11. The apparatus of claim 8 wherein the gas detector is further operable to quantify at least one gas selected from the group consisting of methane, ethane, ethylene, acetylene, propane, propylene, n-butane, or iso-butane, and combinations thereof.

12. The apparatus of claim 8, further comprising a relief valve that is disposed on the expansion chamber.

13. The apparatus of claim 9 further comprising a flow meter fluidically coupled between the heat exchanger and the expansion chamber.

14. A system comprising:
    a heat exchanger;
    a cooling tower;
    a cooling stream fluidically coupled to an outlet of the heat exchanger and an inlet of the cooling tower;
    an expansion chamber having an inlet to receive a slip stream from a cooling fluid stream;
    a liquid level sensor disposed within the expansion chamber;
    a control valve operable to maintain a liquid level in the expansion chamber; and
    a hydrogen detector disposed in a headspace within the expansion chamber, wherein the hydrogen detector is operable to quantify a concentration of hydrogen in the slip stream before the slip stream is returned to the cooling fluid stream.

15. The system of claim 14, further comprising a relief valve that is disposed on the expansion chamber.

16. The system of claim 15, wherein conditions in the expansion chamber include ambient conditions.

17. The system of claim 16 wherein the signal is a 4-20 mA signal.

18. The system of claim 14 wherein the hydrogen detector is configured to detect a concentration of hydrogen in parts per million, as a percentage of lower explosive limit, or a combination thereof.

19. The system of claim 14 further comprising a gas detector configured to detect at least one gas selected from the group consisting of methane, ethane, ethylene, acetylene, propane, propylene, n-butane, or iso-butane, and combinations thereof.

20. The system of claim 14 further comprising a flow meter fluidically coupled between the heat exchanger and the expansion chamber.

\* \* \* \* \*

UNITED STATES PATENT AND TRADEMARK OFFICE
CERTIFICATE OF CORRECTION

PATENT NO. : 11,300,372 B2
APPLICATION NO. : 16/434298
DATED : April 12, 2022
INVENTOR(S) : William Robert Johnson It is certified that error appears in the above-identified patent and that said Letters Patent is hereby corrected as shown below:

In the Specification

Column 2, Line 3, please remove "for example, Hz" and replace with --for example, $H_2$--.

Signed and Sealed this
Fourteenth Day of June, 2022

Katherine Kelly Vidal
*Director of the United States Patent and Trademark Office*